United States Patent [19]

Ewing

[11] 4,072,552

[45] Feb. 7, 1978

[54] ULTRAVIOLET BLISTER SEALING MEANS

[75] Inventor: William D. Ewing, Warren, R.I.

[73] Assignee: Foxon Packaging Corporation, Providence, R.I.

[21] Appl. No.: 739,555

[22] Filed: Nov. 8, 1976

[51] Int. Cl.² .................... B32B 19/02; B65C 11/04; E04B 1/00
[52] U.S. Cl. .................................... 156/380; 53/282; 156/272; 156/290; 156/578
[58] Field of Search ............... 156/272, 380, 578, 290; 53/184 R, 282

[56] References Cited

U.S. PATENT DOCUMENTS

| | | | |
|---|---|---|---|
| 3,191,359 | 6/1965 | Stark | 53/282 |
| 3,472,723 | 10/1969 | Lemelson | 53/184 |
| 3,792,567 | 2/1974 | Balcome | 53/282 |
| 3,804,691 | 4/1974 | Trivedi | 156/272 |
| 3,926,640 | 12/1975 | Rosen | 156/272 |
| 4,021,897 | 5/1977 | Fisli | 156/272 |

*Primary Examiner*—Douglas J. Drummond
*Attorney, Agent, or Firm*—Barlow & Barlow

[57] ABSTRACT

A packaging system which incorporates a bonding of a blister material and a backing material by means of a bond which is curable by ultraviolet radiation.

4 Claims, 2 Drawing Figures

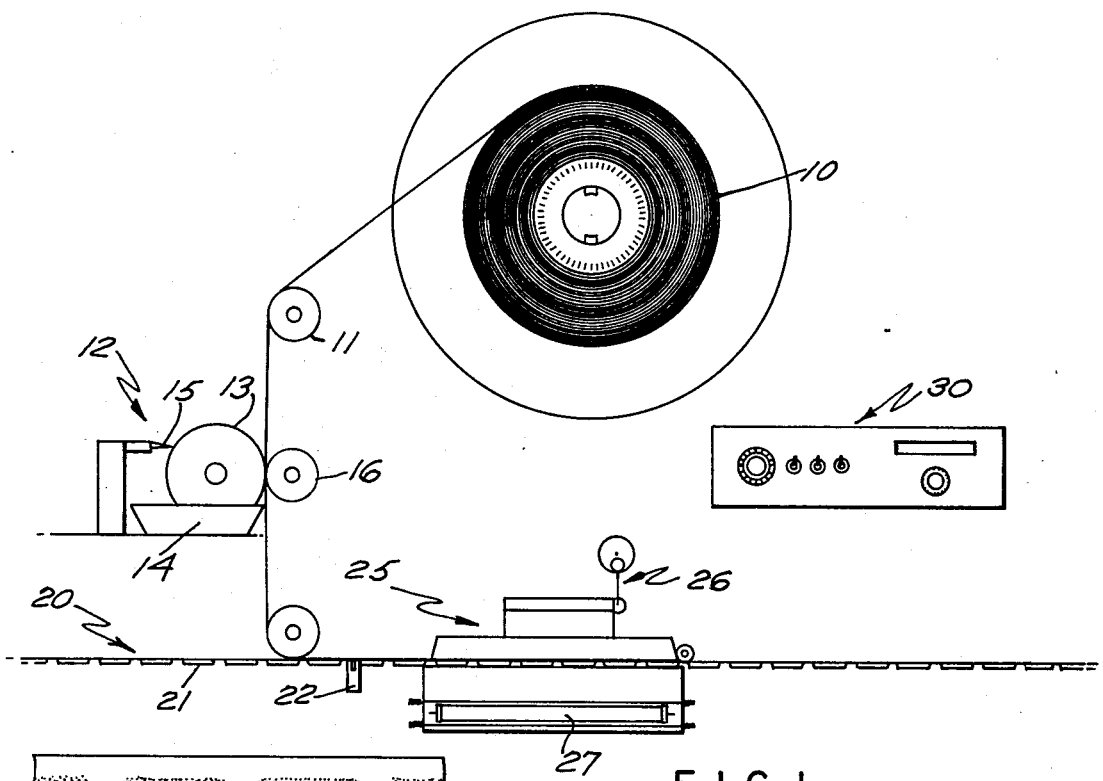
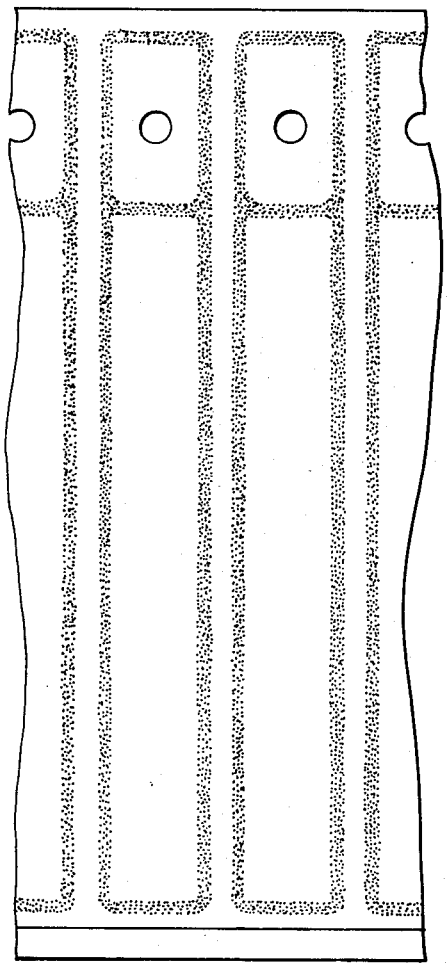
FIG. 1
FIG. 2

ULTRAVIOLET BLISTER SEALING MEANS

BACKGROUND OF THE INVENTION

Packaging machines where a blister package is formed are often formed of various modules, such as unwinding, heating, moulding, feeding, filling, sealing, and so forth, and in this fashion may be combined for any particular packaging requirement. One of the modules is a sealing station in which module the blister material and the backing material are sealed together after filling the blister with such article as is to be carried therein. The sealing stations or module in the most advanced packaging machines are now sealed by heat, that is the generation of some heat for bonding the two together. An example of such a thermoforming device is shown in U.S. Pat. No. 3,686,059. The heat that is needed requires a certain dwell time in the formation of the bond, and it is this dwell time that limits the speed with which the packaging machine can operate and prevents continuous operation, the feed being intermittent. This occurs in more than one packaging machine of the most modern types now available, and it is this sealing station with which this invention is concerned. Another factor involved in the heating for curing of the bonding material is that when the machine is stopped, care must be taken that the heat which is concentrated will not burn up the paper upon which it is acting, and consequently must be shut off first before the machine is stopped, and then to start the machine up again, there has to be a dwell time for heating in order for this to function.

SUMMARY OF THE INVENTION

In order to approach the sealing station in a different manner than has been done in the prior art, an ultraviolet radiation seal is utilized. The backing material is printed in a pattern with an ultraviolet curable bond and then this backing material is fed to the blister material and is registered therewith by mechanical pins or electric eye and then, by means of a reciprocating pressure plate, the two are pressed together and at the time the two materials are being pressed together, a lamp which generates ultraviolet radiation is ignited and the cure of the bonding material by the ultraviolet light radiated from this lamp is effected. The cure is substantially instantaneous and the limit of the dwell which has heretofore occurred in machines of this character is eliminated. Since the bond is performed rapidly, the sealing station as heretofore known may be discarded as a limiting factor of the packaging machine. With controlled ultraviolet radiation, the problem of burning up the backing material is eliminated particularly since the lamp may be ignited at controlled pulse repetition rates of a fraction of a second duration.

DESCRIPTION OF THE DRAWINGS

FIG. 1 represents a diagrammatic view of the sealing unit and the adjoining parts which are operated therewith;

FIG. 2 represents a typical coated blister pack.

DESCRIPTION OF THE PREFERRED EMBODIMENT

In the drawing which illustrates one form of practicing the invention, 10 designates a coil of backing material which may be of most any material such as foil, paper, metal or plastic, which is sufficiently flexible to be rolled in a spiral coil. This backing material may be preprinted with a package design. Suitable means are utilized for feeding this material over a guide roll 11 and to a printing station designated generally 12 and which consists of a gravure cylinder 13 having raised parts which pick up coating material from the tray 14 and scrape off any excess by means of a doctor blade 15 and then rotate to contact the backing material and print the coating material thereon in under five mil thickness as backed up by the rubber roll 16 in a desired pattern. The blister material is designated generally 20 which is transparent such as polyvinyl chloride (PVC) or a polyolefin and comprises a plurality of blisters 21 in web form which are fed so as to join with the backing material led about the roll 17. An electric eye 22 maintains registration of the printed backing material and the blister material, and the two materials then advance together beneath a pressure plate 25 which may be actuated by some reciprocating motion designated diagrammatically at 26 to press the two materials together or in some cases it can remain stationary. As the two materials are pressed together, a lamp 27 is ignited to give off ultraviolet radiation which acts upon the printed coating to cure it and at these points where this coating is provided instantaneously bond the backing material to the blister material forming a firm bond.

The coating material, it will be understood, is the material which is cured by ultraviolet radiation which is instantaneous as the pressure of the plate on the blister material occurs. Such materials as a benzoin ether (U.S. Pat. No. 2,448,828) marketed as "Vicure-10" by Stauffer Chemical Company and also marketed by Union Carbide Co. as overprint varnish, and Loctite Corporation and ThioKol as U.V. adhesives, examples thereof being disclosed in U.S. Pat. Nos. 3,700,643 and 3,704,264. Ultraviolet radiation occurs from a Xeon lamp or some other similar lamp which might be a mercury vapor lamp. After the sealing has been performed, the web of blister material and its backing are fed together to a cutting die where the web is cut so that the individual packages are formed as usual in the packaging machines of this character.

It will be understood, of course, that the ultraviolet radiation will be controlled in a manner known to those in the electronic arts, and more specifically it will be understood that the ultraviolet source will be mounted in a suitable lamp housing reflector assembly which will not only support the lamp but will reflect the ultraviolet energy in a pattern best suited for curing in the particular arrangement that is desired. The accessory equipment which I have broadly indicated at 30 of the drawing consists of a high voltage source to initiate the arc and then a lower voltage to sustain the arc while it is operating. Further, as well known to those skilled in the art, a current-limiting device is necessary to prevent current rushes during the warmup period of the lamp, which are generally known in the trade as ballast devices. Further within the housing suitable electrical controls can change the intensity of the output of the lamp and generally also include stabilized voltage supplies to insure constant output regardless of line voltage fluctuations.

It should additionally be noted that in some applications the apparatus disclosed herein can be operated on a continuous basis or on an intermittent feed basis. The apparatus is operated on an intermittent feed basis the web containing the blisters 20 and the web of backing material will be fed into the reflector housing of the lamp assembly on a basis where a certain number of blisters, for example 6 as indicated in the drawing, will be radiated at once and then the webs will move forward to seal six more blisters. Alternately, of course, it is possible to do this on a continuous basis in view of the fact that the lamp is on only momentarily, that is for a fraction of a second, and with proper timing a similar result could be obtained on a continuous basis. In FIG. 2 of the drawings there is illustrated a typical blister package, the stippled area illustrating the pattern which is applied by the cylinder 13 to the backing material. It will be noted that it is necessary to apply the coating for sealing only to a relatively small area so that this system is very economical to operate. Further it will be apparent that these coatings can, for example, be formulated for moisture barrier characteristics and as such can provide a variety of packaging configurations limited only by the ingenuity of the packaging engineer.

I claim:
1. A packaging mechanism comprising means for feeding a transparent blister material, means for feeding a backing material, bond means for printing in a pattern ultraviolet curable coating on one of said materials, means for registering said materials, means reciprocating for pressing said materials together and means to expose said bond means to ultraviolet rays during the pressing of said materials together, all of said means operating as the feeding is continuously advanced.

2. A packaging mechanism as in claim 1 wherein the printing of the coating is on the backing material.

3. A packaging mechanism as in claim 1 wherein the pressing means reciprocates intermittently.

4. A packaging mechanism as in claim 1 wherein said feed is intermittent and said pressing means reciprocates intermittently in time with said feeding means.

* * * * *